US011595620B2

(12) United States Patent
Kronenberger

(10) Patent No.: US 11,595,620 B2
(45) Date of Patent: Feb. 28, 2023

(54) METHOD AND APPARATUS FOR FACILITATING PRODUCT SALES FROM A REMOTE LOCATION

(71) Applicant: Robert Kronenberger, Deerfield, IL (US)

(72) Inventor: Robert Kronenberger, Deerfield, IL (US)

( * ) Notice: Subject to any disclaimer, the term of this patent is extended or adjusted under 35 U.S.C. 154(b) by 0 days.

(21) Appl. No.: 17/010,117

(22) Filed: Sep. 2, 2020

(65) Prior Publication Data

US 2022/0070413 A1 Mar. 3, 2022

(51) Int. Cl.

| | |
|---|---|
| ***H04N 7/18*** | (2006.01) |
| ***H04N 5/225*** | (2006.01) |
| ***G06Q 30/0241*** | (2023.01) |
| ***H04N 5/38*** | (2006.01) |

(52) U.S. Cl.

CPC ......... *H04N 7/183* (2013.01); *G06Q 30/0276* (2013.01); *G06Q 30/0277* (2013.01); *H04N 5/2256* (2013.01); *H04N 5/38* (2013.01)

(58) Field of Classification Search

CPC .......... H04N 7/18; H04N 7/183; H04N 5/445; H04N 5/2256; H04N 5/38; G06Q 30/0276; G06Q 30/0277

USPC ............................................ 348/143; 725/60

See application file for complete search history.

(56) References Cited

U.S. PATENT DOCUMENTS 6,408,647 B1 * 6/2002 Koll .................. A44C 17/0258 63/26
7,899,705 B2 * 3/2011 Fuisz .................. G06F 16/735 725/135
8,924,261 B2 * 12/2014 Stinchcomb ........... G06Q 50/01 705/26.1
10,176,469 B2 * 1/2019 Mao ........................ G07F 9/026
10,776,833 B2 * 9/2020 Chanda ............. G06Q 30/0254
2011/0239255 A1 * 9/2011 Hecht .................... G06Q 10/10 725/60
2013/0208085 A1 * 8/2013 Marion ............. G06Q 30/0603 348/36

* cited by examiner

*Primary Examiner* — Trang U Tran
(74) *Attorney, Agent, or Firm* — Wood, Phillips, Katz, Clark & Mortimer

(57) ABSTRACT

A method of, and system for, presenting a product to an audience. The method includes the steps of: obtaining a lightbox assembly having a volume in which at least a part of the product to be presented can be placed; placing the at least part of the product in the volume of the lightbox with the lightbox at a first location; illuminating the at least part of the product in the volume of the lightbox; and continuously transmitting images of the at least part of the product illuminated in the volume of the lightbox through a wired or wireless network that are viewed by at least a first user at a second location.

17 Claims, 2 Drawing Sheets

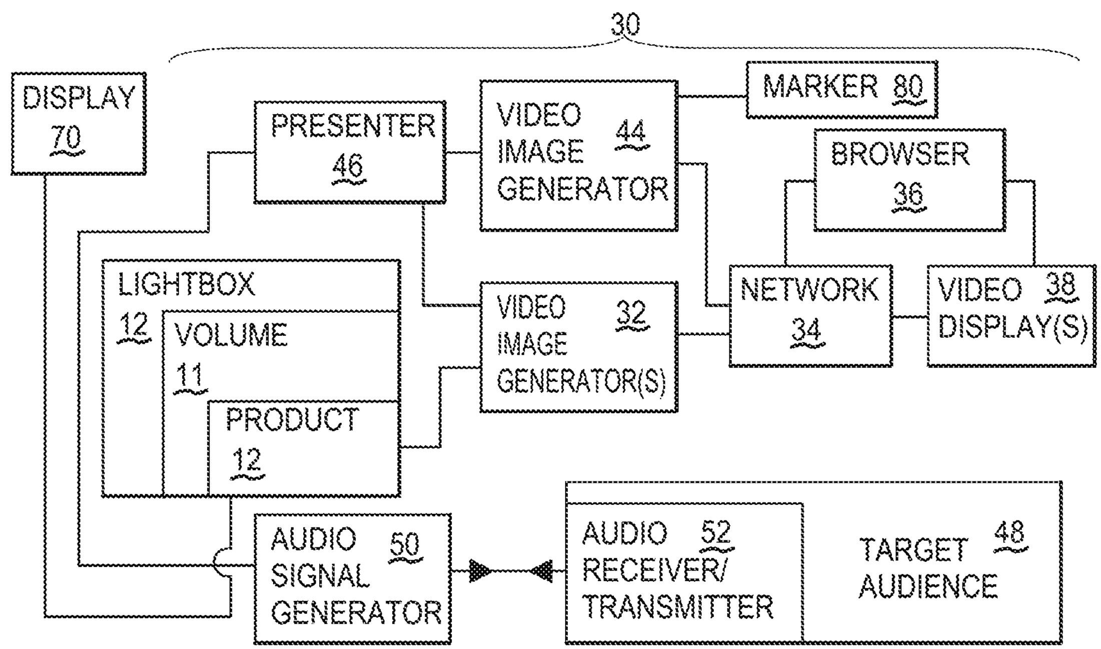
*Fig. 6*
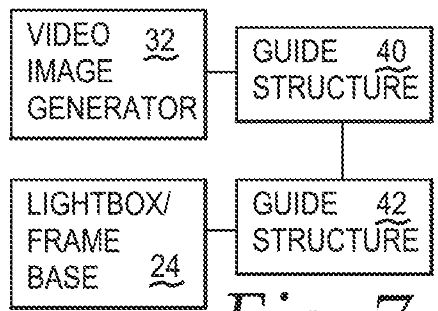
*Fig. 7*
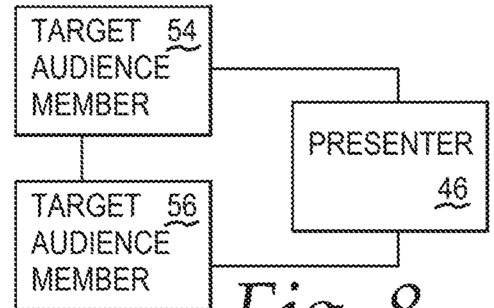
*Fig. 8*
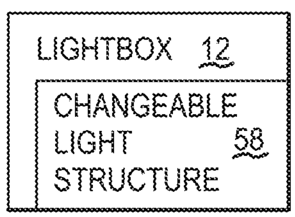
*Fig. 9*
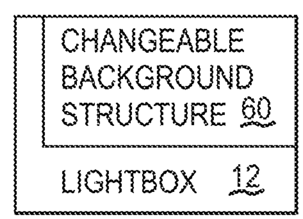
*Fig. 10*
*Fig. 11*
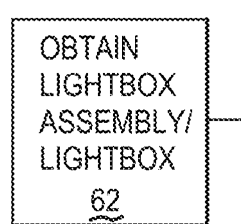
PLACE PRODUCT/ PRODUCT PART 64
ILLUMINATE DISPLAYED PRODUCT 66
TRANSMIT IMAGE 68

METHOD AND APPARATUS FOR FACILITATING PRODUCT SALES FROM A REMOTE LOCATION

BACKGROUND OF THE INVENTION

Field of the Invention

This invention relates to product sales and, more particularly, to a method and apparatus for presenting a product for consideration by/sale to a prospective purchaser at a remote location.

Background Art

Promotion of products to prospective customers has generally been carried out by having a person physically handle and inspect what he/she might be purchasing. This sales model has long been practiced for many categories of products, including those ranging from relatively small and transportable to those that are much larger, such as motor vehicles, etc. Onsite inspection is desirable for many reasons, one of which is the ability to inspect fine product details that may ultimately influence a purchasing decision.

The inventor herein offers different apparel items to many different industries. Aesthetics are generally critical in sales of this type of product. The distinction between one product and the next may relate to detailed ornamentation, stitching patterns, fabric textures, etc. This detail is commonly discernible only by inspecting products up close and in person.

The recent pandemic has altered human interaction worldwide. Avoiding proximity to other humans is a constant guideline which has generally changed sales approaches and in many instances has compromised the effectiveness thereof.

Many entities have attempted to improvise by conducting meetings through computers, as by using the Zoom® platform which allows simulation of a joint, face-to-face meeting with a product or image thereof in a digital window to be shared by all participants. Sellers are presented the challenge of maintaining a meaningful human interaction during such meetings while at the same time highlighting a product that is being promoted.

Generally, the approach in these situations has been to place a product directly in front of a computer camera and transmit images to remote participants. Essentially, the sales person becomes a camera operator, or an observer at the site of the product, with the inability to at all times effectively associate his/her image with the product during a presentation.

As one example, there is currently airing a car commercial in which a customer requests a salesperson to use a camera to transmit images of different parts of a vehicle—inside and out. The salesperson narrates but does not effectively appear in any of the images together with the vehicle.

While camera technology has developed greatly over the years in terms of the ability to create and transmit sharp images, aside from lacking the "personal touch", the transmitted images generally do not have the sharpness that is demanded to present critical details of product appearance that may be key to consummating a sale. Such images may be no more impressive than an image in a brochure and may be compromised by poor camera quality, bad or inconsistent viewing perspective, lighting issues, shadowing, blending with background surfaces of objects, etc.

Given that large volume and dollar commitments are often at stake with these types of product presentations, customers may be reluctant to make any commitment given uncertainty as to precisely how a product is constructed and/or appears by reason of limitations in the above-described presentation method. Sales may be lost or deferred in anticipation of communal health concerns changing in the future.

Accordingly, purveyors of goods may often be forced to make financial concessions to address this buyer uncertainty which ultimately may reduce product revenues and profit.

In spite of the fact that at the time this case is being filed approximately six months have passed since the inception of the health pandemic, the above "virtual" sales model has been the only one known to the inventor herein that is being practiced across many different industries worldwide with many different categories of products. The industry continues to be in need of solutions to the above problems which may be critical to an acceptable bottom line, and in a worst case, potentially business survival, particularly given the uncertainties associated with the current pandemic and the recognition that it may have an extended existence.

SUMMARY OF THE INVENTION

In one form, the invention is directed to a method of presenting a product to an audience. The method includes the steps of: obtaining a lightbox having a volume in which at least a part of the product to be presented is placed; placing the at least part of the product in the volume of the lightbox with the lightbox at a first location; illuminating the at least part of the product in the volume of the lightbox; and continuously transmitting images of the at least part of the product illuminated in the volume of the lightbox through a wired or wireless network that are viewed by at least a first user at a second location, remote from the first location.

In one form, the step of continuously transmitting images involves streaming images of the at least part of the product illuminated in the volume of the lightbox.

In one form, the step of continuously transmitting images involves transmitting changed versions of the images of the at least part of the product illuminated in the volume of the lightbox.

In one form, the method of presenting a product to an audience further includes the step of changing how the at least part of the product is illuminated in the volume of the lightbox to thereby provide a changed version of the transmitted images of the at least part of the product illuminated in the volume of the lightbox.

In one form, the method of presenting a product to an audience further includes the step of changing a perspective from which the at least part of the product illuminated in the volume of the lightbox is viewed to thereby provide a changed version of the transmitted images of the at least part of the product illuminated in the volume of the lightbox.

In one form, the step of continuously transmitting images involves continuously operating a video image generator to continuously generate video signals.

In one form, the step of changing a perspective involves changing a relationship between the video image generator and the at least part of the product illuminated in the volume of the lightbox.

In one form, the method of presenting a product to an audience further includes the step of obtaining a product repositioning assembly. The step of changing a relationship between the video image generator and the at least part of the product illuminated in the volume of the lightbox involves reorienting the at least part of the product illuminated in the volume of the lightbox through the product repositioning assembly.

In one form, the method of presenting a product to an audience further includes the step of continuously transmitting audio signals from a presenter through a wired or wireless connection simultaneously with the continuously transmitting of the images of the at least part of the product illuminated in the volume of the lightbox to the at least first user at the second location.

In one form, the method of presenting a product to an audience further includes the step of continuously transmitting video images of a presenter through a wired or wireless connection simultaneously with the continuously transmitting of the audio signals and the images of the at least part of the product illuminated in the volume of the lightbox to the at least first user at the second location.

In one form, the continuously transmitting of the images of the at least part of the product illuminated in the volume of the lightbox takes place over the internet.

In one form, the method of presenting a product to an audience further includes the step of conducting a real-time dialog between the presenter and the at least one user as the images of the at least part of the product illuminated in the volume of the lightbox are streaming.

In one form, the presenter is present at the first location. The step of continuously transmitting video images of the presenter involves transmitting images of the presenter interacting with the at least part of the product illuminated in the volume of the lightbox at the first location.

In one form, the method of presenting a product to an audience further includes the step of conducting a real-time dialog between the presenter, the first user, and at least a second user at a third location.

In one form, the invention is directed to a communication system for facilitating presentation of a product to an audience. The communication system includes: a lightbox at a first location and having a volume within which a product to be presented is placed and illuminated; at least one video image generator, the at least one video image generator configured to continuously transmit video image signals of an illuminated product in the volume of the lightbox; a video display at a second location; and a network through which a user can access the video image signals of the illuminated product in the volume of the lightbox at the first location through a browser to allow processing of the video image signals and viewing of continuously transmitted video images of the illuminated product in the volume of the lightbox on the video display at the second location.

In one form, the lightbox has a support to maintain a product to be illuminated in a display position in the volume of the lightbox. The support is configured to allow reorientation of a product in the display position in the volume of the lightbox relative to the at least one video image generator.

In one form, the at least one video image generator is configured to allow the images of a product in the display position to be generated from a plurality of different perspectives.

In one form, the network is configured so that the at least one video image generator can generate video image signals of a presenter at the first or another location to be transmitted simultaneously with the video image signals of an illuminated product in the display position in the volume of the lightbox.

In one form, the communication system is further configured to transmit audio signals generated at each of the first and second locations to the other of the first and second locations and to allow a presenter at the first location and a user at the second location to conduct a real-time dialog.

In one form, the communication system is further configured to allow the video image signals generated at the first location to be processed and viewed through a browser at a third location and to allow audio signals from the third location to be transmitted to the second location and audio signals from the first and second locations to be transmitted to the third location whereby at least a three-way real-time dialog can be conducted between the presenter and target audience members/users at each of the second and third locations.

In one form, the communication system further includes a drive for moving at least a part of the support to thereby reorient a product in the display position in the volume of the lightbox.

In one form, the communication system further includes a controller for operating the drive in response to at least one of: a) a preprogrammed input; and b) commands input by a presenter.

In one form, the communication system further has an adjustable marker that is configured to controllably visibly highlight different parts of an illuminated product in the volume of the lightbox as seen on video images displayed at the second location.

BRIEF DESCRIPTION OF THE DRAWINGS

FIG. 6 is a schematic representation of a communication system for facilitating presentation of a product to an audience and including the structure in FIGS. 2-5;

FIG. 7 is a schematic representation of structure for repositioning a video image generator relative to a displayed product in the communication system in FIG. 6;

FIG. 8 is a schematic representation of an exemplary model for communicating between a presenter and multiple target audience members/users at different locations;

FIG. 9 is a schematic representation of structure for changing light characteristics of the lightbox volume in FIGS. 2, 3, and 6;

FIG. 10 is a schematic representation of structure for changing background for a displayed product in the lightbox volume; and FIG. 11 is a schematic representation of a method for presenting a product to an audience according to the present invention.

DETAILED DESCRIPTION OF THE PREFERRED EMBODIMENT

The present invention is directed to a method and system for facilitating presentation of a product to an audience. The audience may be one or more individuals that are critiquing the product and/or working on development of the product, potential users or purchasers of the product, or any other audience that may have a need to critically look at the structure, function, and/or appearance of a product.

Figure 1:
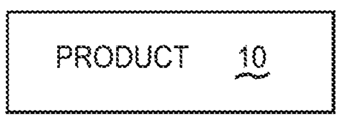
FIG. 1 is a schematic representation of a product of the type which can be presented to an audience using the present invention.

The invention is particularly adaptable, but not limited, to a portable type product, as shown generically at 10 in FIG. 1.

Figure 2:
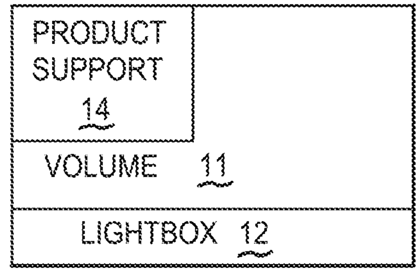
FIG. 2 is a schematic representation of a lightbox, according to the invention, used in conjunction with a product to present images thereof to an audience.

Generally, the product 10 is of a nature that is capable of having at least a part thereof placed within a volume 11 in a "lightbox", as shown schematically at 12 in FIG. 2. A "lightbox", as used herein, is any structure of the type commonly employed in photography, or that might be derived from this technology, that uses different means for diffusing light within the lightbox volume 11 in which a product is photographed.

"Lightbox", within the generic showing in FIG. 2, also encompasses a structure that contrasts a product against a lighted background even if there is not structure that physically bounds a three-dimensional volume to receive a product, or a part thereof. The lightbox walls may be semi-transparent in nature to diffuse light coming from several different directions and from one or a plurality of independent sources. The objective of the lightbox 11 is to provide a relatively uniform light on a product while minimizing shadow so that the viewer sees a very sharp contrast between the product and the background to thereby highlight the overall shape and surface details thereof. The light can be of a nature and intensity to highlight even fine product detail.

The basic lightbox construction as depicted generally in FIG. 2 is intended to encompass virtually an unlimited number of different structures that accomplish the same basic objective, including but not limited to those conventionally identified by the term "lightbox" or "light box".

According to the invention, a product support 14 is provided within the volume 11, which volume is bounded, entirely or in part, by surfaces which may be structural and/or aesthetic in nature; in the latter case to control how light is projected directly or indirectly at a product in a display position on the support 14. A product is considered herein to be within a controlled volume even if it is contrasted against a substantially two-dimensional background.

Figure 3:
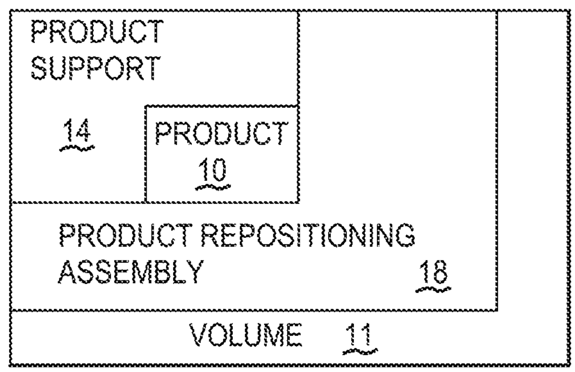
FIG. 3 is a schematic representation of further details of the lightbox in FIG. 2.

In one form, as shown in FIG. 3, the product support 14 is part of a product repositioning assembly 18, which allows a product 10 on the product support 14 to be strategically reoriented within the volume 11.

Figure 4:
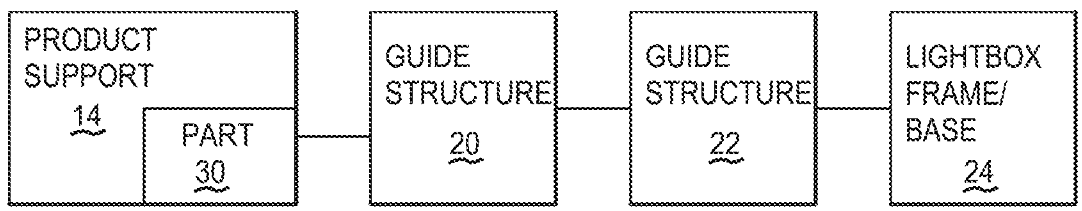
FIG. 4 is a schematic representation showing structure on the lightbox in FIGS. 2 and 3 which allows reorienting of a displayed product in an illuminated volume within the lightbox.

The product repositioning assembly 18 may be constructed so that a user manually repositions the product support 14 as by moving the product support 14 in a predetermined and controlled manner, preferably dictated by guide structure 20 on the product support 14, as shown in FIG. 4, that cooperates with guide structure 22 on a frame/base 24 making up part of the light box 12, or a support therefor.

Figure 5:
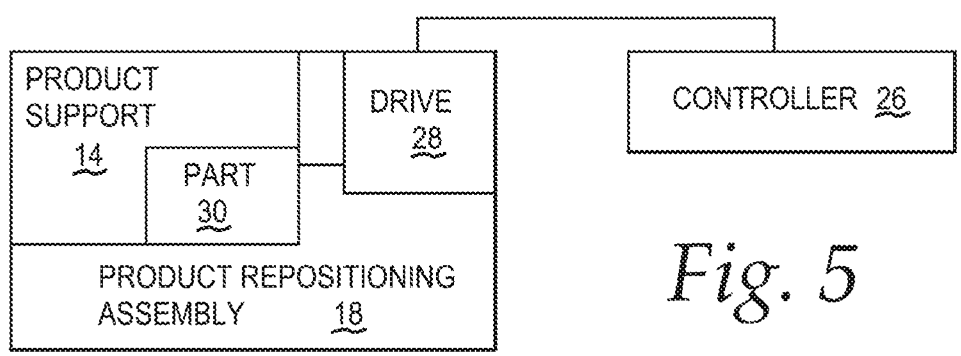
FIG. 5 is a schematic representation of structure for controllably repositioning a displayed product in the illuminated volume of the lightbox.

Alternatively, as shown in FIG. 5, a controller 26 for a drive 28 may be operated to cause the drive 28 to move a part 30 of the product repositioning assembly 18, together with the product 10, in either a predetermined path or one selected by the operator.

As shown in FIG. 6, one aspect of the present invention is the provision of a communication system 30 for facilitating presentation of a product to an audience. The communication system 30 is made up of the lightbox 12, at a first location, having the aforementioned volume 11 within which a product to be presented is placed and illuminated, and at least one video image generator 32 configured to continuously transmit video image signals of the illuminated product 10, or part thereof, in the lightbox volume 11. For purposes of simplicity in the description and claims herein, placement of any part of a product in the lightbox volume 11 will be considered to be placing the product therein.

The video image generator 32 in one form continuously streams video image signals over a network 34. At a second location, a user can access the streaming video image signals through a browser 36 to allow processing thereof and viewing of video images on a video display 38 at the second location.

The network 34 may be a dedicated network or utilize the internet. The first and second locations may be spaced by any distance. For example, given the recent concerns about social distancing, the first and second locations may be in the same open space wherein people wish to keep a comfortable distance while communicating. Alternatively, the spacing may be that between any two locations on the planet.

As noted above, the product support 14, as depicted generically in FIG. 3, may have any construction capable of maintaining a product to be illuminated in a display position in the volume 11. As further noted above, the support may have a relatively fixed orientation or may have the aforementioned part 30 that is controllably movable during operation to thereby strategically reposition the displayed product 10.

While the invention contemplates streaming of a constant live image of the product 10 in the display position from the same perspective, in a more preferred form, the images may be streamed changed, or changing, versions of images of the product 10 from different perspectives or a continuously varying perspective which allows the user at the second location to continuously observe the product 10 as the video perspective is changing.

As explained above with respect to FIG. 4, the product support 14, and more particularly the part 30 thereon, may be moved relative to the lightbox frame or a base structure 24 through cooperating guide structure 20, 22 thereon.

Alternatively, or in addition thereto, as shown in FIG. 7, the video image generator 32 may be movable relative to the displayed product 32 through guide structure 40 thereon that cooperates with guide structure 42 as on the lightbox frame/base 24.

The ability to reorient the video image generator 32 and the part 30 on the product support 14 relative to the lightbox frame/base 24 offers a greater degree of flexibility in terms of being able to display images of all critical areas of the product 10 from multiple different perspectives.

The communication system 30 further preferably includes a video image generator 44 that is capable of transmitting video image signals of a presenter 46 at the first, or another, location, to be transmitted simultaneously with the video image signals of the displayed illuminated product so that images of the presenter 46 and product 10 can be simultaneously viewed on the video display 38.

Many different platforms are currently available to allow a target audience 48 at the second location to simultaneously view images of the presenter 46 and those of the product 10 at the second location. This may be accomplished through use of multiple displays or a split screen arrangement.

It should be understood that the video image generator 44 may be at a third location and might be independent of the video image generator 32. Alternatively, the video image generator 32 may transmit images of the presenter 46 in the presence of the lightbox 12, whereby the presenter 46 can directly interact with the product 10 during a demonstration.

The communication system 30 further includes an audio signal generator 50 configured to transmit an audio signal potentially one-way from the presenter 46 to the target audience 48. More preferably, an audio receiver/transmitter 52 is provided for each target audience participant that allows sending and receiving of audio signals.

In one exemplary form, as shown in FIG. 8, a presenter 46 at one location can communicate with target audience members/users 54, 56 by streaming video images of the product 10 alone and more preferably video images of the product 10 together with images of the presenter 46. At the same time, audio communication is enabled between the presenter 46 and each of the target audience members 54, 56 and between each of the target audience members 54, 56. With this arrangement, a three-way real-time dialog can be conducted between the presenters and target audience members/users 54, 56 at each of second and third locations.

With the communication system 30 as described above, it is possible to conduct a virtual presentation that can effectively mimic an in-person presentation which may be further enhanced by the lightbox aspect that potentially allows highlighting of product appearance and detail. With existing technology, images on video displays 38 can be presented that are potentially sharper than what a person observes by holding the product 10 in hand, or inspecting it from a distance, in a normally lit room.

With the communication system 30 described above, many different models of presentation can be practiced. For example, the presenter 46 can be viewable in conjunction with the displayed product 10 and may physically interact with the product 10 as by pointing to parts thereof. Alternatively, the presenter 46 may be viewed independently of the product 10. Further, during part or all of the presentation, the presenter 46 may have only an audible presence with focus being strictly on the displayed product 10.

By having audience members able to view the product 10 in great detail from one or more remote locations, a conventional-type sales interaction can take place which shares with a target audience adequate visible product characteristics which, together with the input of the presenter 46 may, in the case of a sales presentation, result in a consummated sale.

Accordingly, highly effective presentations may be made without requiring a common location for parties engaging in a business dialog. At the same time, the system 30 may be set up so that all critical parts of the product 10 may be viewed remotely from perspectives as chosen by the presenter and as may be requested by a target audience member.

As shown in FIG. 9, the lightbox 12 may have a changeable light structure 58. The changeable light structure 58 may be controlled to change color and/or intensity of light diffused into the volume 11.

Alternatively, as shown in FIG. 10, the lightbox 12 may incorporate a changeable background structure 60 which allows the displayed product 10 to be seen against a different background. For example, a diffusing wall structure may have writing, depictions of objects, logos, etc., as a backdrop for the displayed product 10.

Changing of the structures 58, 60 may be achievable manually or through appropriate actuating systems.

In one exemplary presentation method, as shown in FIG. 11, a lightbox assembly/lightbox is obtained, as shown at block 62.

As shown at block 64, at least part of a product is placed in the volume of the lightbox assembly/lightbox 62 in a display position thereon at a first location.

As shown at block 66, at least part of the product in the volume of the lightbox is illuminated. "Illuminating", as used herein, is intended to encompass illuminating the product through a backdrop and/or directly illuminating the product at the portion thereof that is being viewed.

As shown at block 68, an image of at least part of the displayed product in the volume of the lightbox is continuously transmitted through a wired or wireless network connection for viewing by at least one user at at least a second location, remote from the first location.

In a preferred form, the step of continuously transmitting the images involves streaming the images to a user to allow continuous real-time viewing of the images of the at least part of the product illuminated in the display position.

Changed versions of the image of the at least part of the product can be continuously transmitted.

The images may be changed by changing how the at least part of the product is illuminated.

Alternatively, the changed version may be a result of changing a perspective from the at least part of the product is viewed.

The product images may be continuously transmitted by operating the video image generator to continuously generate video signals to be processed through a browser at a second location.

The perspective from which the video image is taken may be changed by changing the relationship between the video image generator and the at least part of the product in the display position.

To change this relationship, the at least part of the product in the display position may be reoriented through the product repositioning assembly.

As noted above, an audio signal is transmitted from a presenter simultaneously with the transmission of the image of the at least part of the product in the display position to a second location. The audio signal may be transmitted through a wired or wireless connection.

Through the audio exchange, it is contemplated that sales discussions will occur and that details regarding a transaction will be discussed and agreed upon whereby face-to-face meeting is unnecessary.

In one exemplary scenario, communication may be established over a wired or wireless network between a presenter and at least two target audience members, with all three individuals at different locations. The presenter can choose a preferred presentation method or may defer to the target audiences as to whether they wish to see the displayed product: a) by itself; b) in conjunction with the presenter who is interacting with the displayed product; or c) with a split image where the presenter is isolated from the displayed product. The presenter may use the generated video signals to reproduce the image sent to the target audience members so that he/she can view and confirm precisely what is being observed by the target audience members. An additional display 70 accessible by the presenter 46 may be incorporated into the communication system 30 for this purpose.

The presenter 46 may use his/her best judgment to make a presentation while maintaining an audio connection with each of the target audience members. The target audience members are then able to communicate with each other and with the presenter 46 in response to which the presenter 46 can thereby make adjustments to send changed versions of the images in terms of perspective, lighting, background, etc., to thereby assure that the target audience members have been able to see all features of the product 10 in an effective background setting which highlights product features and details and have had all questions addressed by the presenter.

An additional, optional feature is the incorporation of a marker 80 into the communication system 30. The presenter operates the marker 80 to produce a "pointer" image on the video images displayed at the user location(s). For example, the pointer image may be a dot, an arrow, a simulation of an elongate pointer, etc., or an image of a movable pointing structure within the lightbox volume; that allows the presenter to focus a user's attention on specific parts of a product within the lightbox 12. This may be accomplished through a physical structure associated with the lightbox or electronically through an appropriate controllable signal that generates the image on a user's display.

It should be noted that the invention is not limited to use of any specific platform or app. Thus, specific details thereof are not described herein, as one skilled in the art could utilize many different existing platforms and apps or develop originals ones to practice the invention as described herein. Zoom® is but representative of the many apps and platforms currently available.

The foregoing disclosure of specific embodiments is intended to be illustrative of the broad concepts comprehended by the invention.

The invention claimed is:

1. A method of presenting a product to an audience, the method comprising the steps of:

obtaining a lightbox having a volume in which at least a part of the product to be presented is placed;

placing the at least part of the product in the volume of the lightbox with the lightbox at a first location;

illuminating the at least part of the product in the volume of the lightbox;

continuously transmitting live images of the at least part of the product illuminated in the volume of the lightbox through a wired or wireless network that are viewed by at least a first user at a second location, remote from the first location, wherein the step of continuously transmitting live images comprises streaming live images of the at least part of the product illuminated in the volume of the lightbox, wherein the step of continuously transmitting live images comprises transmitting changed versions of the live images of the at least part of the product illuminated in the volume of the lightbox;

the method further comprising the step of changing a perspective from which the at least part of the product illuminated in the volume of the lightbox is viewed to thereby provide a changed version of the transmitted live images of the at least part of the product illuminated in the volume of the lightbox, wherein the step of continuously transmitting live images comprises continuously operating a video image generator to continuously generate video signals, wherein the step of changing a perspective comprises automatically controllably changing a relationship between the video image generator and the at least part of the product illuminated in the volume of the lightbox by relatively moving one of the at least part of the product and the video image generator relative to the other of the at least part of the product and the video image generator in any of a plurality of different paths as selected by an operator without requiring that an operator manually reposition either the video image generator or the at least part of the product illuminated in the volume of the lightbox; and the method further comprising the step of continuously transmitting audio signals from a presenter through a wired or wireless connection simultaneously with the continuously transmitting of the live images of the at least part of the product illuminated in the volume of the lightbox to the at least first user at the second location.

2. The method of presenting a product to an audience according to claim 1 further comprising the step of changing how the at least part of the product is illuminated in the volume of the lightbox to thereby provide a changed version of the transmitted live images of the at least part of the product illuminated in the volume of the lightbox.

3. The method of presenting a product to an audience according to claim 1 further comprising the step of continuously transmitting live video images of a presenter through a wired or wireless connection simultaneously with the continuously transmitting of the audio signals and the live images of the at least part of the product illuminated in the volume of the lightbox to the at least first user at the second location.

4. The method of presenting a product to an audience according to claim 1 wherein the continuously transmitting of the live images of the at least part of the product illuminated in the volume of the lightbox takes place over the internet.

5. The method of presenting a product to an audience according to claim 1 further comprising the step of conducting a real-time dialog between the presenter and the at least one user as the live images of the at least part of the product illuminated in the volume of the lightbox are streamed.

6. The method of presenting a product to an audience according to claim 3 wherein the presenter is present at the first location and the step of continuously transmitting live video images of the presenter comprises transmitting live images of the presenter interacting with the at least part of the product illuminated in the volume of the lightbox at the first location.

7. The method of presenting a product to an audience according to claim 1 further comprising the step of conducting a real-time dialog between the presenter and the first user, and at least a second user at a third location.

8. The method of presenting a product to an audience according to claim 1 wherein the lightbox has a frame/base and there is guide structure on the video image generator that cooperates with guide structure on the frame/base and the step of changing a perspective comprises causing the video image generator to be guidingly moved relative to the frame/base.

9. A communication system for facilitating presentation of a product to an audience, the communication system comprising:

a lightbox at a first location and having a volume within which a product to be presented is placed and illuminated;

at least one video image generator, the at least one video image generator configured to continuously transmit live video image signals of an illuminated product in the volume of the lightbox;

a video display at a second location;

a network through which a user can access the live video image signals of the illuminated product in the volume of the lightbox at the first location through a browser to allow processing of the live video image signals and viewing of continuously transmitted live video images of the illuminated product in the volume of the lightbox on the video display at the second location, wherein the lightbox has a support to maintain a product to be illuminated in a display position in the volume of the lightbox and the support is configured to allow reorientation of a product in the display position in the volume of the lightbox relative to the at least one video image generator, wherein the communication system further comprises a drive for moving at least a part of the support relative to the at least one video image generator in any of a plurality of different paths as selected by an operator to thereby automatically reorient a product in the display position in the volume of the lightbox relative to the at least one video image generator without requiring an operator to manually move the product; and the method further comprising the step of continuously transmitting audio signals from a presenter through a wired or wireless connection simultaneously with the continuously transmitting of the live images of the at least part of the product illuminated in the volume of the lightbox to the at least first user at the second location.

10. The communication system according to claim 9 wherein the communication system is configured to allow the live images of a product in the display position to be generated from a plurality of different perspectives.

11. The communication system according to claim 9 wherein the network is configured so that the at least one video image generator can generate live video image signals of a presenter at the first or another location to be transmitted simultaneously with the live video image signals of an illuminated product in the display position in the volume of the lightbox.

12. The communication system according to claim 11 wherein the communication system is further configured to transmit audio signals generated at each of the first and second locations to the other of the first and second locations and to allow a presenter at the first location and a user at the second location to conduct a real-time dialog.

13. The communication system according to claim 12 wherein the communication system is further configured to allow the live video image signals generated at the first location to be viewed through a browser at a third location and to allow audio signals from the third location to be transmitted to the second location and audio signals from the first and second locations to be transmitted to the third location whereby at least a three-way real-time dialog can be conducted between the presenter and target audience members/users at each of the second and third locations.

14. The communication system according to claim 9 wherein the communication system further comprises a controller for operating the drive in response to at least one of: a) a preprogrammed input; and b) commands input by a presenter.

15. A communication system for facilitating presentation of a product to an audience, the communication system comprising:

a lightbox at a first location and having a volume within which a product to be presented is placed and illuminated;

at least one video image generator, the at least one video image generator configured to continuously transmit live video image signals of an illuminated product in the volume of the lightbox;

a video display at a second location;

a network through which a user can access the live video image signals of the illuminated product in the volume of the lightbox at the first location through a browser to allow processing of the live video image signals and viewing of continuously transmitted live video images of the illuminated product in the volume of the lightbox on the video display at the second location;

an adjustable marker that is configured to controllably visibly highlight different parts of an illuminated product in the volume of the lightbox as seen on live video images displayed at the second location to allow an operator to selectively focus an audience's attention on specific parts of a product within the lightbox volume, wherein the adjustable marker is in the form of a pointing structure that can be selectively moved and is visible as a pointer image on live video images of the illuminated product displayed at the second location to thereby selectively focus a user's attention on specific parts of a product placed in the lightbox volume; and the method further comprising the step of continuously transmitting audio signals from a presenter through a wired or wireless connection simultaneously with the continuously transmitting of the live images of the at least part of the product illuminated in the volume of the lightbox to the at least first user at the second location.

16. The communication system according to claim 15 wherein the adjustable marker comprises a physical structure associated with the lightbox.

17. The communication system according to claim 15 wherein the adjustable marker is generated electronically through a controllable signal that generates an image on the video display at the second location.

* * * * *